(12) United States Patent
Nasu et al.

(10) Patent No.: US 11,884,996 B2
(45) Date of Patent: Jan. 30, 2024

(54) IRON-BASED ALLOY SINTERED BODY AND IRON-BASED MIXED POWDER FOR POWDER METALLURGY

(71) Applicant: JFE STEEL CORPORATION, Tokyo (JP)

(72) Inventors: Nao Nasu, Tokyo (JP); Takuya Takashita, Tokyo (JP); Akio Kobayashi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 189 days.

(21) Appl. No.: 17/595,648

(22) PCT Filed: Apr. 10, 2020

(86) PCT No.: PCT/JP2020/016187
§ 371 (c)(1),
(2) Date: Nov. 22, 2021

(87) PCT Pub. No.: WO2020/241087
PCT Pub. Date: Dec. 3, 2020

(65) Prior Publication Data
US 2022/0219229 A1    Jul. 14, 2022

(30) Foreign Application Priority Data

May 24, 2019 (JP) ................................. 2019-097928

(51) Int. Cl.
*C22C 33/02* (2006.01)
*B22F 1/00* (2022.01)
(Continued)

(52) U.S. Cl.
CPC ............ *C22C 33/0257* (2013.01); *B22F 1/00* (2013.01); *B22F 1/09* (2022.01); *B22F 1/10* (2022.01);
(Continued)

(58) Field of Classification Search
None
See application file for complete search history.

(56) References Cited

U.S. PATENT DOCUMENTS 6,660,056 B2   12/2003  Hayashi et al.
10,207,328 B2   2/2019  Takashita et al.
(Continued)

FOREIGN PATENT DOCUMENTS

CA      2992092 A1   3/2017
CN    107000053 A    8/2017
(Continued)

OTHER PUBLICATIONS

Aug. 17, 2021, Notification of Reasons for Refusal issued by the Japan Patent Office in the corresponding Japanese Patent Application No. 2020-537798 with English language Concise Statement of Relevance.
(Continued)

*Primary Examiner* — Xiaobei Wang
(74) *Attorney, Agent, or Firm* — KENJA IP LAW PC

(57) ABSTRACT

Provided is an iron-based alloy sintered body having a tensile strength of 800 MPa or more, excellent machinability, a microstructure with an average Vickers hardness of 300 Hv or more and 900 Hv or less and a standard deviation of Vickers hardness of 200 Hv or less, and an average pore circularity of 0.30 or more.

12 Claims, 1 Drawing Sheet

(51) Int. Cl.
  *C22C 38/00* (2006.01)
  *C22C 38/18* (2006.01)
  *B22F 1/10* (2022.01)
  *C22C 38/12* (2006.01)
  *C22C 38/16* (2006.01)
  *B22F 3/16* (2006.01)
  *C22C 38/04* (2006.01)

(52) U.S. Cl.
  CPC .............. *B22F 3/16* (2013.01); *C22C 38/001* (2013.01); *C22C 38/04* (2013.01); *C22C 38/12* (2013.01); *C22C 38/16* (2013.01); *C22C 38/18* (2013.01); *B22F 2301/10* (2013.01); *B22F 2301/35* (2013.01); *B22F 2302/40* (2013.01); *B22F 2304/10* (2013.01)

(56) References Cited

U.S. PATENT DOCUMENTS

| | | |
|---|---|---|
| 2002/0043131 A1 | 4/2002 | Nakamura et al. |
| 2003/0056621 A1 | 3/2003 | Nakamura et al. |
| 2005/0039576 A1 | 2/2005 | Unami et al. |
| 2006/0137488 A1 | 6/2006 | Sakaue et al. |
| 2008/0175740 A1 | 7/2008 | Ruthner |
| 2008/0233421 A1 | 9/2008 | Tanino et al. |
| 2010/0080725 A1 | 4/2010 | Fujitsuka et al. |
| 2010/0154588 A1 | 6/2010 | Berg et al. |
| 2012/0048063 A1 | 3/2012 | Maetani et al. |
| 2012/0286191 A1 | 11/2012 | Maeda et al. |
| 2014/0238192 A1 | 8/2014 | Otsuka et al. |
| 2015/0314372 A1 | 11/2015 | Ono et al. |
| 2016/0223016 A1 | 8/2016 | Ito et al. |
| 2017/0259340 A1 | 9/2017 | Takashita et al. |
| 2017/0349981 A1 | 12/2017 | Nakamura et al. |
| 2018/0178291 A1* | 6/2018 | Takashita ................. B22F 1/10 |
| 2018/0193908 A1* | 7/2018 | Takashita ................ C22C 38/16 |
| 2018/0193911 A1* | 7/2018 | Kobayashi .............. C22C 33/02 |
| 2018/0221960 A1 | 8/2018 | Machida et al. |

FOREIGN PATENT DOCUMENTS

| | | |
|---|---|---|
| CN | 2018016881 A | 2/2018 |
| CN | 107921531 A | 4/2018 |
| CN | 108025357 A | 5/2018 |
| CN | 108026614 A | 5/2018 |
| JP | S63235403 A | 9/1988 |
| JP | H11229001 A | 8/1999 |
| JP | 2009242887 A | 10/2009 |
| JP | 2010529302 A | 8/2010 |
| JP | 2011122198 A | 6/2011 |
| JP | 2013204112 A | 10/2013 |
| KR | 20090100907 | * 9/2009 |
| WO | 2014103287 A1 | 7/2014 |
| WO | 2016088333 A1 | 6/2016 |

OTHER PUBLICATIONS

Jun. 23, 2020, International Search Report issued in the International Patent Application No. PCT/JP2020/016187.

Feb. 18, 2023, Office Action issued by the China National Intellectual Property Administration in the corresponding Chinese Patent Application No. 202080037016.3 with English language search report.

Dec. 11, 2022, Office Action issued by the Korean Intellectual Property Office in the corresponding Korean Patent Application No. 10-2021-7037063 with English language concise statement of relevance.

Oct. 11, 2022, the Extended European Search Report issued by the European Patent Office in the corresponding European Patent Application No. 20814461.8.

Jan. 27, 2023, Office Action issued by the Canadian Intellectual Property Office in the corresponding Canadian Patent Application No. 3,138,161.

Seijiro Maki et al., Resistance Sintering of Copper-Graphite Powder Mixture under Pressure, Materials Science Forum, Mar. 15, 2004, vols. 449-452, pp. 281-284.

Aug. 20, 2023, Office Action issued by the Korean Intellectual Property Office in the corresponding Korean Patent Application No. 10-2021-7037063 with English language concise statement of relevance.

Aug. 28, 2023, Office Action issued by the Canadian Intellectual Property Office in the corresponding Canadian Patent Application No. 3,138,161.

* cited by examiner

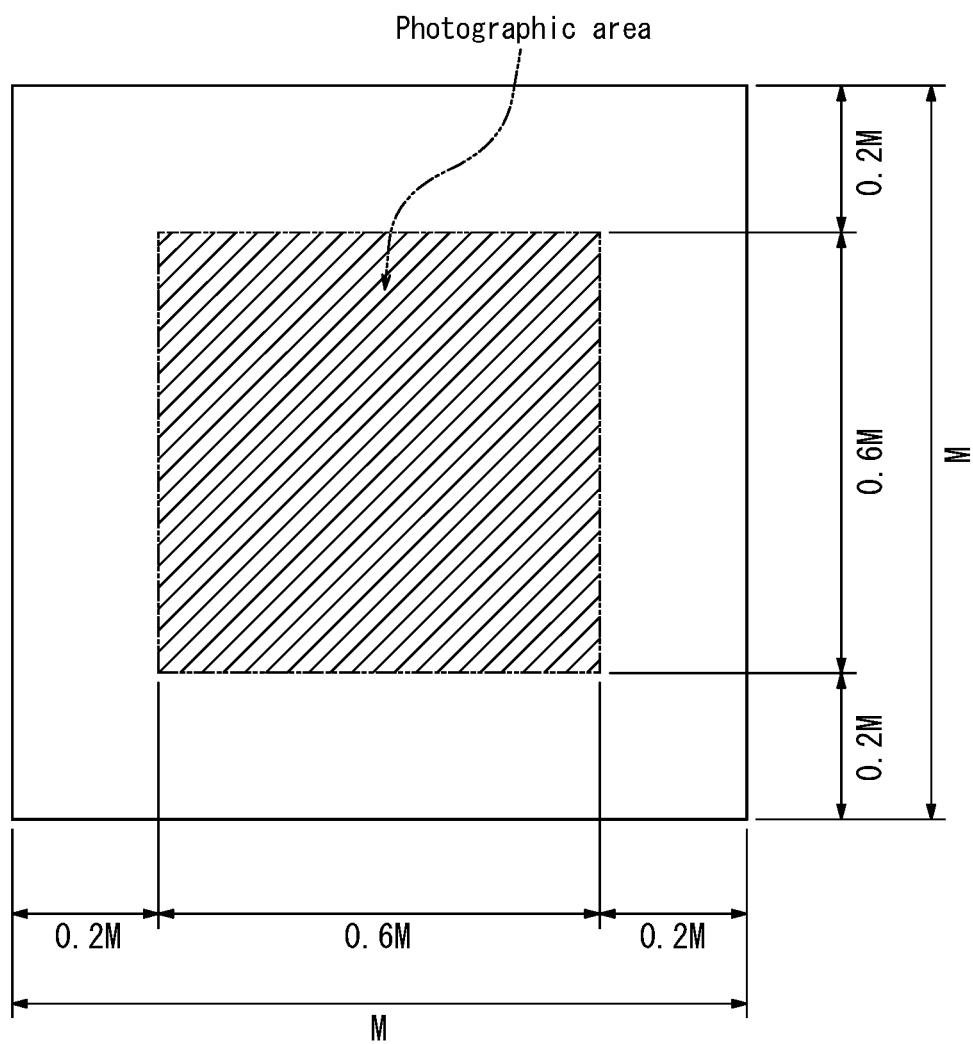

IRON-BASED ALLOY SINTERED BODY AND IRON-BASED MIXED POWDER FOR POWDER METALLURGY

TECHNICAL FIELD

The present disclosure relates to an iron-based alloy sintered body and an iron-based mixed powder for powder metallurgy.

BACKGROUND

Powder metallurgical techniques enable manufacture of parts with complicated shapes in shapes extremely close to the products' shapes (i.e., near net shapes) with high dimensional accuracy, and significantly reducing machining costs in manufacturing the parts. Therefore, powder metallurgical products are widely used as all kinds of parts for machines. Further, to cope with demands for reductions in size and weight and increasing complexity of parts, requirements for powder metallurgical techniques are becoming more stringent.

Against the background of the above, a technique for manufacturing a sintered body with a tensile strength of 800 MPa or more and excellent machinability has been developed.

For example, JP2013-204112A (PTL 1) proposes an iron-based sintered alloy in which 97% or more by area ratio of a metal structure excluding pore parts is a martensite phase in order to secure strength equivalent to or greater than that of an existing Fe—Ni—Cu—Mo alloy without using Ni to achieve cost reduction and productivity improvement by shortening sintering time.

JP2010-529302A (PTL 2) discloses a technique for cost-effectively manufacturing a pressed and sintered part having good mechanical properties using an iron-based powder having Mo, Ni and Cu.

Further, JP2011-122198 A (PTL 3) discloses a technique for improving machinability by using a mixed powder for powder metallurgy blended with a powder for improving machinability comprising soft metal compound particles and hard metal compound particles to obtain a sintered body having a matrix in which the soft metal compound particles and the hard metal compound particles are dispersed.

CITATION LIST

Patent Literature

PTL 1: JP2013-204112A
PTL 2: JP2010-529302A
PTL 3: JP2011-122198A

SUMMARY

Technical Problem

However, the conventional techniques described in PTL 1 to PTL 3 have the following problems.

With respect to PTL 1, since an alloyed steel powder used for manufacturing the sintered body (iron-based sintered alloy) contains Cr and Mn, which are easily oxidized, the sintered body (iron-based sintered alloy) is easily oxidized, tending to deteriorate mechanical properties.

With respect to PTL 2, since the iron-based powder used in the manufacture of the pressed and sintered part contains Ni which slowly diffuses in a metal structure, retained austenite is generated in the sintered body, tending to cause a decrease in tensile strength of the sintered body. Further, the inclusion of the retained austenite as a soft phase and a hard phase in the sintered body deteriorates the machinability.

With respect to PTL 3, the predetermined powder for improving machinability needs to be added to the mixed powder for powder metallurgy, which incurs cost increase.

It could thus be helpful to provide a sintered body having a tensile strength of 800 MPa or more and excellent machinability.

Solution to Problem

As a result of intensive studies, we found that an iron-based alloy sintered body having a tensile strength of 800 MPa or more and excellent machinability can be obtained by controlling the average pore circularity, and the average Vickers hardness and standard deviation of Vickers hardness of the microstructure of the iron-based alloy sintered body.

We thus provide the following.

[1] An iron-based alloy sintered body comprising:
a microstructure having an average Vickers hardness of 300 Hv or more and 900 Hv or less and a standard deviation of Vickers hardness of 200 Hv or less,
wherein an average pore circularity is 0.30 or more.

[2] The iron-based alloy sintered body according to [1], wherein a density is 6.6 $Mg/m^3$ or more.

[3] The iron-based alloy sintered body according to [1] or [2] comprising a chemical composition containing (consisting of)
Cu: 1.8 mass % or more and 10.2 mass % or less,
Mo: 2.0 mass % or less, and
C: 0.2 mass % or more and 1.2 mass % or less,
with the balance being Fe and inevitable impurities.

[4] The iron-based alloy sintered body according to [3], wherein Mo is contained in an amount of 0.5 mass % or more and 2.0 mass % or less.

[5] An iron-based mixed powder for powder metallurgy comprising: an alloyed steel powder obtained by pre-alloying Cu or Mo and Cu;
a Cu powder;
a graphite powder,
wherein the iron-based mixed powder for powder metallurgy has a chemical composition containing (consisting of)
Cu: 1.8 mass % or more and 10.2 mass % or less,
Mo: 2.0 mass % or less, and
C: 0.2 mass % or more and 1.2 mass % or less,
with the balance being Fe and inevitable impurities, and
the Cu powder is contained in an amount of 0.3 mass % or more.

[6] The iron-based mixed powder for powder metallurgy according to [5], wherein
the alloyed steel powder obtained by pre-alloying Cu or Mo and Cu is an alloyed steel powder obtained by pre-alloying Mo and Cu, and
Mo is contained in an amount of 0.5 mass % or more and 2.0 mass % or less.

[7] The iron-based mixed powder for powder metallurgy according to [5] or [6], wherein the alloyed steel powder has a mean particle size of 30 μm or more and 120 μbm or less.

[8] The iron-based mixed powder for powder metallurgy according to any one of [5] to [7], further comprising a lubricant.

Advantageous Effect

The present disclosure provides an iron-based alloy sintered body having a tensile strength of 800 MPa or more and excellent machinability.

Since the iron-based alloy sintered body of the present disclosure does not need to contain Cr or Mn, a decrease in strength due to oxidation of the sintered body caused by these elements can be avoided. Further, since the iron-based alloy sintered body of the present disclosure does not need to contain Ni, a decrease in tensile strength and machinability due to the formation of retained austenite can be avoided. In addition, the iron-based alloy sintered body of the present disclosure can be manufactured without using a predetermined powder for improving machinability (powder for improving machinability comprising soft metal compound particles and hard metal compound particles), thereby suppressing cost increase.

BRIEF DESCRIPTION OF THE DRAWING

In the accompanying drawing:
FIG. 1 illustrates an example of a photographic area of a cut section of a sintered body for the measurement of average circularity.

DETAILED DESCRIPTION

<Iron-Based Alloy Sintered Body>

The iron-based alloy sintered body of the present disclosure (hereinafter also referred to as "sintered body") is described in detail. In this specification, the term "iron-based" means that Fe is contained in an amount of 50 mass % or more.

[Vickers Hardness]

The iron-based alloy sintered body of the present disclosure has a microstructure having an average Vickers hardness of 300 Hv or more and 900 Hv or less and a standard deviation of Vickers hardness of 200 Hv or less. The Vickers hardness of the sintered body can be determined by micro-Vickers hardness measurement as follows.

An indenter (diamond-made quadrangular pyramid having an angle between the opposite faces of 136°) is indented into a center part of a cut section of the sintered body with an indentation load of 98 N and a retention time of 10 seconds. The indentation is performed at least 5 μm away from a pore. When a pore exists at an indentation planned position, indentation is not performed but a next indentation planned position is indented.

From the measured values of 30 indentations, the average (arithmetic mean) and standard deviation of Vickers hardness are calculated. The Vickers hardness thus obtained is the Vickers hardness of a part without pores of the sintered body (microstructure).

The average Vickers hardness of the sintered body is set to 300 Hv or more and 900 Hv or less. With a Vickers hardness of less than 300 Hv, it is difficult to achieve a tensile strength of 800 MPa or more. On the other hand, with a Vickers hardness exceeding 900 Hv, the notch sensitivity increases at pores and thus the sintered body is not sufficiently elongated during a tensile test, which makes it difficult to obtain a tensile strength of 800 MPa. The average Vickers hardness is preferably 500 Hv or more. The average Vickers hardness is preferably 850 Hv or less.

The standard deviation of Vickers hardness of the sintered body is set to 200 Hv or less. This is because with a Vickers hardness exceeding 200 Hv, the machinability is deteriorated due to the soft phase in the microstructure. The standard deviation is preferably 180 Hv or less. The lower limit is 0 and the standard deviation of Vickers hardness may be 0.

[Average Pore Circularity]

The iron-based alloy sintered body of the present disclosure has an average pore circularity of 0.30 or more. The average pore circularity of the sintered body can be determined by image interpretation as follows.

A cut section of the sintered body is mirror polished and a center part (e.g., a part at a position of ⅕ or more of the depth from a surface. See FIG. 1 for the photographic area for the case where the sintered body is a rod-shaped sintered body with a width and length of M mm.) of the cut section is photographed using an optical microscopy (100 magnifications).

For each of the obtained photographs of the cut section (over five fields with a size of about 0.8 mm×0.6 mm), the area A and the circumference length l of each pore are measured by image interpretation. Software that can perform such image interpretation includes, for example, Image J (open source, c).

From the obtained area A and circumference length l, the circularity c is calculated using the following formula:

[Formula 1]

$$c = \frac{4\pi A}{l^2}. \quad (1)$$

The circularity is an index of pore shape, and it increases as the pore shape approaches a perfect circle. The areas of all pores are then integrated in ascending order of circularity and a circularity $c_i$ at which the integrated value is 50% of the total area of all pores is determined for each field. $c_i$ is calculated in each of the five fields, the results are averaged, and the average value is used as average circularity.

Stress which causes fracture is more concentrated at a pore with a more irregular shape, deteriorating tensile strength. Therefore, when the average pore circularity is less than 0.30, the pore shape is excessively irregular, which makes it difficult to achieve a tensile strength of 800 MPa or more. Thus, the average pore circularity is set to 0.30 or more. The average pore circularity is preferably 0.35 or more. The upper limit is 1 and the average pore circularity may be 1.

[Sintered Body Density]

The density of the sintered body is preferably 6.6 Mg/m³ or more. A density of less than 6.6 Mg/m³ is excessively low, which makes it difficult to achieve a tensile strength of 800 MPa or more. The density is preferably 6.9 Mg/m³ or more. A larger density is preferable from the viewpoint of obtaining high tensile strength. No upper limit is placed on the density, but since the density of pure iron is 7.9 Mg/m³, the density of the sintered body can be smaller than that, for example, 7.6 Mg/m³ or less. The density of the sintered body can be limited within a predetermined range by controlling the density of a green compact in the manufacture of the sintered body.

[Chemical Composition]

The iron-based alloy sintered body can have a chemical composition containing Cu of 1.8 mass % or more and 10.2 mass % or less, Mo of 2.0 mass % or less, and C of 0.2 mass % or more and 1.2 mass % or less, with the balance being Fe and inevitable impurities. The chemical composition includes, for example, a chemical composition containing Cu: 1.8 mass % or more and 10.2 mass % or less and C: 0.2 mass % or more and 1.2 mass % or less, with the balance being Fe and inevitable impurities, and a chemical composition containing Cu: 1.8 mass % or more and 10.2 mass % or less, Mo: 0.5 mass % or more and 2.0 mass % or less, and C: 0.2 mass % or more and 1.2 mass % or less, with the balance being Fe and inevitable impurities.

(Cu Content)

The Cu content in the sintered body is preferably 1.8 mass % or more. The Cu content in the sintered body is preferably 10.2 mass % or less. When the Cu content is less than 1.8 mass %, quenching tends to be insufficient, and furthermore, the average Vickers hardness of the microstructure of the sintered body tends to be less than 300 Hv, which may make it difficult to achieve a tensile strength of 800 MPa or more. When the Cu content is more than 10.2 mass %, the average Vickers hardness of the microstructure of the sintered body tends to be more than 900 Hv, and accordingly, the notch sensitivity increases at pores and the tensile strength may decrease. The Cu content is preferably 3.5 mass % or more. The Cu content is preferably 8.0 mass % or less.

Cu in the sintered body can be derived from a Cu powder or an alloyed steel powder containing Cu. The Cu powder added to the iron-based mixed powder for powder metallurgy can melt into a liquid phase at 1085° C. (the melting point of copper) during sintering and fills voids between the powder particles to make the shapes of the pores in the sintered body closer to circular from irregular, and thus increase the circularity. In order to obtain such an effect, the amount of Cu derived from the Cu powder in the sintered body is preferably set to 0.3 mass % or more. When the Cu content is less than 0.3 mass %, the pore circularity does not increase sufficiently, which may make it difficult to achieve a tensile strength of 800 MPa or more in the sintered body. The amount of Cu derived from the Cu powder is more preferably 0.5 mass % or more. The amount of Cu derived from the Cu powder is preferably 5.0 mass % or less, and more preferably 3.0 mass % or less.

(Mo Content)

The sintered body can contain Mo in an amount of 2.0 mass % or less. Although the sintered body may not contain Mo, the inclusion of Mo facilitates sufficient quenching and further facilitates achieving an average Vickers hardness of 300 Hv or more and a tensile strength of 800 MPa or more in the sintered body. From the viewpoint of obtaining this effect sufficiently, the Mo content is preferably 0.5 mass % or more and more preferably 1.0 mass % or more. The Mo content is more preferably 1.5 mass % or less. On the other hand, when the Mo content is more than 2.0 mass %, the average Vickers hardness of the microstructure of the sintered body tends to be more than 900 Hv, and accordingly, the notch sensitivity increases at pores and the tensile strength may decrease. Therefore, the Mo content is preferably 2.0 mass % or less.

(C Content)

The C content in the sintered body is preferably 0.2 mass % or more. The C content in the sintered body is preferably 1.2 mass % or less. The inclusion of C increases the hardness of the microstructure of the sintered body and also improves the quench hardenability, thereby increasing the tensile strength of the sintered body. When the C content is less than 0.2 mass %, quenching is insufficient, and furthermore, the average Vickers hardness of the microstructure of the sintered body tends to be less than 300 Hv, which may make it difficult to achieve a tensile strength of 800 MPa or more. When the C content is more than 1.2 mass %, the average Vickers hardness of the microstructure of the sintered body tends to be more than 900 Hv, and accordingly, the notch sensitivity increases at pores and the tensile strength may decrease. The C content is more preferably 0.4 mass % or more. The C content is more preferably 1.0 mass % or less. C in the sintered body can be derived from the graphite powder.

The balance of the sintered body is Fe and inevitable impurities. The inevitable impurities are impurities that are inevitably mixed in during the manufacturing process and the like, and include, for example, O, N, S, Mn, and Cr. At least one selected from the group consisting of these elements may be contained. The contents of the elements as inevitable impurities preferably fall within the following ranges:

O: 0.30 mass % or less, more preferably 0.25 mass % or less;
N: 0.004 mass % or less;
S: 0.03 mass % or less;
Mn: 0.5 mass % or less; and
Cr: 0.2 mass % or less.

<Iron-Based Mixed Powder for Powder Metallurgy>

The sintered body of the present disclosure can be manufactured by sintering an iron-based mixed powder for powder metallurgy (hereinafter also referred to as "mixed powder"). Examples of the iron-based mixed powder for powder metallurgy include an iron-based mixed powder for powder metallurgy comprising an alloyed steel powder obtained by pre-alloying Cu or Mo and Cu, a Cu powder and a graphite powder.

(Alloyed Steel Powder Obtained by Pre-Alloying Cu or Mo and Cu)

The alloyed steel powder obtained by pre-alloying Cu or Mo and Cu is one of an alloyed steel powder obtained by pre-alloying Cu or an alloyed steel powder obtained by pre-alloying Mo and Cu. These alloyed steel powders have high quench hardenability, and thus high tensile strength is easily acquired and the formation of a soft phase in the sintered body can be sufficiently suppressed to form a uniform hard phase. The alloyed steel powder obtained by pre-alloying Mo and Cu is preferably used.

In order to obtain sufficient tensile strength in an as-sintered state (without being subjected to further heat treatment), the alloying of quench hardenability-improving elements is effective. The effectiveness of the quench hardenability-improving elements is Mn>Mo>P>Cr>Si>Ni>Cu>S in the descending order.

On the other hand, the atomization method is often employed in the manufacture of general alloyed steel powders, and the powders manufactured by the atomization method are usually subjected to heat treatment (finish-reduction). Among the above quench hardenability-improving elements, the easiness of reduction in a $H_2$ atmosphere at 950° C., which is a common condition for finish-reduction, is Mo>Cu>S>Ni in the descending order, and thus Mn and Cr cannot be reduced in a $H_2$ atmosphere at 950° C., which is the common condition for finish-reduction.

Thus, both Mo and Cu have quench hardenability equivalent to or higher than Ni and are more susceptible to H2 reduction than Ni, Mn and Cr. By using Cu or Mo and Cu as an alloying element, the quench hardenability can be improved and oxidation can be suppressed.

Components other than Cu or Mo and Cu in the alloyed steel powder obtained by pre-alloying Cu or Mo and Cu are Fe and inevitable impurities. The inevitable impurities are impurities that are inevitably mixed in during the manufacturing process, and include, for example, C, S, O, N, Mn, and Cr. At least one selected from the group consisting of these elements may be contained. The contents of the elements as inevitable impurities preferably fall within the ranges below. By setting the contents of these impurity elements in the following ranges, the compressibility of the alloyed steel powder can be further improved.

C: 0.02 mass % or less
O: 0.30 mass % or less, more preferably 0.25 mass % or less
N: 0.004 mass % or less
S: 0.03 mass % or less
Mn: 0.5 mass % or less
Cr: 0.2 mass % or less The smaller mean particle size of the alloyed steel powder obtained by pre-alloying Cu or Mo and Cu results in the increase of spring back during forming, occurring cracks in a green compact. Therefore, the mean particle size is preferably set to 30 μm or more, and more preferably 50 μm or more. Furthermore, as the mean particle sizes become smaller, Cu and C do not diffuse into every space between Fe particles but diffuse into some spaces between Fe particles. Therefore, the microstructure of the sintered body becomes non-uniform and the standard deviation of Vickers hardness is outside of the predetermined range, which tends to reduce machinability. Further, the larger mean particle size increases the size of the pores of the sintered body, leading to deterioration in strength. Therefore, the mean particle size is preferably 120 μm or less, and more preferably 100 μm or less. Furthermore, as the mean particle size becomes larger, Cu and C diffuse into each space between Fe particles but do not diffuse uniformly into each space between Fe particles. Therefore, the microstructure of the sintered body becomes non-uniform and the standard deviation of Vickers hardness is outside of the predetermined range, which tends to reduce machinability. In the specification, the mean particle size refers to the median size D50 determined from the cumulative weight distribution, and is a value found by determining a particle size distribution using a sieve according to JIS Z 8801-1, producing a cumulative particle size distribution from the resulting particle size distribution, and finding a particle size obtained when the oversized particles and the undersized particles constitute 50% by weight each. The maximum particle size of the alloyed steel powder obtained by pre-alloying Mo or Mo and Cu can be 250 μm or less, and it is preferably 200 μm or less and more preferably 180 μm or less.

The manufacturing method of the alloyed steel powder obtained by pre-alloying Cu or Mo and Cu is not particularly limited, and includes, for example, the water atomizing method.

(Cu Powder)

By using a Cu powder as an alloying powder in the mixed powder, the Cu powder can melt into a liquid phase during sintering and fill voids between the powder particles, increasing the pore circularity in the sintered body.

From the viewpoint of avoiding the risk of a Cu powder with a large particle size melting during sintering, expanding the volume of the sintered body to reduce the density of the sintered body, the mean particle size of the Cu powder is preferably 50 μm or less and more preferably 40 μm or less. Although no lower limit is placed on the mean particle size of the Cu powder, the mean particle size of the Cu powder is preferably set to 0.5 μm or more in order not to increase the manufacturing cost unreasonably.

(Graphite Powder)

By using a graphite powder as an alloying powder in the mixed powder, C can be included in the sintered body to increase the hardness of the microstructure of the sintered body and to improve the quench hardenability, thereby increasing the tensile strength of the sintered body. A graphite powder with a mean particle size of 1 μm or more and 50 μm or less can be used.

The iron-based mixed powder for powder metallurgy can have a chemical composition containing Cu: 1.8 mass % or more and 10.2 mass % or less, Mo: 2.0 mass % or less, and C: 0.2 mass % or more and 1.2 mass % or less, with the balance being Fe and inevitable impurities. The chemical composition includes a chemical composition containing Cu: 1.8 mass % or more and 10.2 mass % or less and C: 0.2 mass % or more and 1.2 mass % or less, with the balance being Fe and inevitable impurities, and chemical composition containing Cu: 1.8 mass % or more and 10.2 mass % or less, Mo: 0.5 mass % or more and 2.0 mass % or less, and C: 0.2 mass % or more and 1.2 mass % or less, with the balance being Fe and inevitable impurities.

The preferable Cu content, Mo content and C content are the same as those in the sintered body, and the descriptions (including examples and preferable ranges) of the sintered body are applied to them.

The Cu powder is preferably contained in an amount of 0.3 mass % or more in the iron-based mixed powder for powder metallurgy. When the Cu content is less than 0.3 mass %, the pore circularity does not increase sufficiently, which may make it difficult to achieve a tensile strength of 800 MPa or more in the sintered body. The content of the Cu powder is more preferably 0.5 mass % or more. The content of the Cu powder is preferably 5.0 mass % or less and more preferably 3.0 mass % or less.

C is contained as a graphite powder in the iron-based mixed powder for powder metallurgy, and the content of the graphite powder is equal to the C content in the chemical composition. The content of the graphite powder can be 0.2 mass % or more and 1.2 mass % or less in the iron-based mixed powder for powder metallurgy. When the content of the graphite powder is less than 0.2 mass %, quenching is insufficient, and furthermore, the average Vickers hardness of the microstructure of the sintered body tends to be less than 300 Hv, which may make it difficult to achieve a tensile strength of 800 MPa or more. When the content of the graphite powder is more than 1.2 mass %, the average Vickers hardness of the microstructure of the sintered body tends to be more than 900 Hv, and accordingly, the notch sensitivity increases at pores and the tensile strength may decrease. The content of the graphite powder is more preferably 0.4 mass % or more. The content of the graphite powder is more preferably 1.0 mass % or less.

The types and contents of the inevitable impurities are the same as those in the sintered body, and the descriptions (including examples and suitable ranges) of the sintered body are applied to them.

[Lubricants and the Like]

The mixed powder can further contain a lubricant. The addition of the lubricant can facilitate removal of a green compact from a die. The lubricant is not particularly limited. For example, an organic lubricant can be used and at least one selected from the group consisting of a fatty acid, a fatty acid amide, a fatty acid bisamide, or a metal soap can be used. Metal soaps (for example, lithium stearate, zinc stearate) and amide-based lubricants (for example, ethylene bis stearamide) are preferable. The mix proportion of the lubricant is preferably 0.1 parts by mass or more and 1.2 parts by mass or less to 100 parts by mass of the iron-based mixed powder for powder metallurgy. A content of the lubricant of 0.1 parts by mass or more can sufficiently facilitate removal of a green compact from a die. On the other hand, a content of the lubricant of 1.2 parts by mass or less makes it possible to avoid a decrease in tensile strength of the sintered body due to an increase in the proportion of non-metal in the entire mixed powder. The mixed powder may contain publicly known additives and the like unless they adversely affect the effect of the present disclosure.

<Manufacture of Sintered Body>

The iron-based mixed powder for powder metallurgy of the present disclosure can be used to obtain a sintered body. The method of manufacturing the sintered body is not particularly limited, and examples thereof include a method of green compacting the mixed powder to obtain a green compact and then subjecting it to sintering treatment. The use of a mixed powder containing a lubricant is preferable.

[Green Compacting]

The green compacting of the mixed powder to obtain a green compact is preferably performed with a pressure of 400 MPa or more and 1000 MPa or less. With a pressure of less than 400 MPa, the green density is low and accordingly, the density of the sintered body decreases and thus the tensile strength may decrease. On the other hand, with a pressure exceeding 1000 MPa, the load on a die increases to shorten the life of the die, increasing economic load.

The temperature in green compacting is preferably normal temperature (about 20° C.) or higher. The temperature in green compacting is preferably 160° C. or lower. In order to set the temperature to normal temperature or lower, equipment for cooling to normal temperature or lower is necessary. On the other hand, since the green density increases as the temperature rises, green compacting at normal temperature or lower offers little advantage. At a temperature exceeding 160° C., ancillary equipment is required, which increases economic load.

[Sintering]

The sintering temperature in sintering the above green compact is preferably 1100° C. or higher. The sintering temperature in sintering the above green compact is preferably 1300° C. or lower. At a temperature below 1100° C., the sintering does not progress sufficiently, and the tensile strength may decrease. At a temperature exceeding 1300° C., although the tensile strength of the sintered body increases, the manufacturing cost increases.

The sintering time is preferably 15 minutes or more. The sintering time is preferably 50 minutes or less. A sintering time shorter than 15 minutes results in insufficient sintering, which can reduce tensile strength. A sintering time longer than 50 minutes results in a significant increase in manufacturing cost required for sintering.

The cooling rate during cooling after the sintering is preferably 20° C./min or more. The cooling rate during cooling after the sintering is preferably 40° C./min or less. A cooling rate of less than 20° C./min may not enable sufficient quenching, and the tensile strength may decrease. When the cooling rate is 40° C./min or more, ancillary equipment to accelerate the cooling rate is required, which increases manufacturing cost.

The resulting sintered body may be subjected to treatment such as carburizing-quenching and tempering.

EXAMPLES

More detailed description is given below based on examples. The following examples merely represent preferred examples of the present disclosure, and the present disclosure is not limited to these examples.

Alloyed steel powders having the chemical compositions consisting of the alloying elements of the types and contents listed in Table 1 with the balance being Fe and inevitable impurities (with the mean particle sizes listed in Table 1) were mixed with an alloying powder (Cu powder (with a mean particle size of about 25 μm) and a graphite powder (with a mean particle size of about 5 μm)) in the amounts listed in Table 1 to obtain iron-based mixed powders.

Further, 0.5 parts by mass of ethylene bis stearamide (EBS) as a lubricant was added to 100 parts by weight of the iron-based mixed powders to obtain mixed powders for manufacturing a green compact.

Each of the mixed powders for manufacturing a green compact was loaded into a die with a predetermined shape and compacted until the density of a resulting green compact reached 7.0 Mg/m$^3$ to obtain a green compact. Some samples were compacted until the density of resulting green compacts reached 6.6 Mg/m$^3$ or more and 7.3 Mg/m$^3$ or less to obtain green compacts.

These green compacts were sintered in an RX gas (propane modified gas) atmosphere at 1130° C. for 20 minutes, and cooled at a cooling rate of 30° C./min to obtain sintered bodies (ring-shaped sintered bodies (38 mm in outer diameter, 25 mm in inner diameter, 10 mm in height), rod-shaped sintered bodies (55 mm in length, 10 mm in width, 10 mm in thickness), flat tensile test pieces prescribed in JIS Z 2550 and lathe turning test pieces (60 mm in outer diameter, 20 mm in inner diameter, 20 mm in thickness) were obtained.

The obtained sintered bodies were evaluated as follows. The results are listed in Table 1.

Regarding the obtained ring-shaped sintered bodies, the outer diameter, inner diameter, thickness, and mass were measured, and the sintered body density was calculated.

Using the obtained flat tensile test pieces, the tensile test was conducted according to JIS Z 2550 to measure the tensile strength.

Each of the obtained rod sintered bodies was cut in a central portion thereof and the cut section was mirror polished. Micro-Vickers hardness measurement was carried out in a center part with a size of 6 mm×6 mm of the cut section as described above to obtain the average Vickers hardness and standard deviation of Vickers hardness. The indentation was performed at constant intervals of 0.1 mm. When a pore existed at an indentation planned position, indentation was not performed but a next indentation planned position was indented. The Vickers hardness was measured in a total of 30 points.

Each of the obtained rod-shaped sintered bodies was cut in a central portion thereof and the cut section was mirror polished. A center part with a size of 6 mm×6 mm of the cut section was photographed using an optical microscopy (100 magnifications). For the obtained photographs of the cut section (over five fields with a size of 826 μm×619 μm), the average pore circularity was calculated by image interpretation using Image J (open source, US National Institutes of Health) as described above.

Three of the obtained ring-shaped sintered bodies were stacked on top of each other, and their sides were cut with a lathe. A cemented carbide turning tool was used with a turning speed of 120 m/min, a feed rate of 0.1 mm/cycle, a turning depth of 0.5 mm, and a turning distance of 1000 m. After the cutting, the width of a wear mark (flank wear width) of the turning tool was measured. Using, as a standard, a flank wear width of 0.98 mm of the turning tool in the sample No. 1 containing Ni as a comparative material, when a sintered body had a smaller flank wear width than the standard, the sintered body was evaluated to have excellent machinability.

TABLE 1

| | Iron-based mixed powder for powder metallurgy | | | | | | Sintered body | | | | | | | | |
|---|---|---|---|---|---|---|---|---|---|---|---|---|---|---|---|
| | Alloyed steel powder | | | | Alloying powder Addition amount*3 (mass %) | | Chemical composition*4 (mass %) | | | | | | Vickers hardness (Hv) | | Pore Average circularity | Lathe turnability Flank wear width of |
| | Chemical composition*1 (mass %) | | | Mean particle size*2 | | | | | | | Density | Tensile strength | | | | |
| No. | Mo | Cu | Ni | (μm) | Graphite powder | Cu powder | Mo | Cu | C | Ni | (Mg/m³) | (MPa) | Average | Standard deviation | (—) | cutting tool (mm) | Remarks |
| 1 | 1.3 | 3.0 | 2.0 | 89.2 | 0.8 | 2.0 | 1.3 | 4.9 | 0.8 | 1.9 | 7.0 | 831 | <u>296</u> | <u>264</u> | 0.41 | 0.98 | Comparative Example |
| 2 | 0.0 | 3.0 | — | 71.9 | 0.8 | 2.0 | 0.0 | 4.9 | 0.8 | — | 7.0 | 851 | 685 | 124 | 0.42 | 0.41 | Example |
| 3 | 0.5 | 3.0 | — | 68.0 | 0.8 | 2.0 | 0.5 | 4.9 | 0.8 | — | 7.0 | 848 | 321 | 65 | 0.41 | 0.19 | Example |
| 4 | 0.8 | 3.0 | — | 81.2 | 0.8 | 2.0 | 0.8 | 4.9 | 0.8 | — | 7.0 | 892 | 498 | 116 | 0.40 | 0.30 | Example |
| 5 | 1.0 | 3.0 | — | 69.4 | 0.8 | 2.0 | 1.0 | 4.9 | 0.8 | — | 7.0 | 947 | 634 | 174 | 0.41 | 0.42 | Example |
| 6 | 1.3 | 3.0 | — | 76.9 | 0.8 | 2.0 | 1.3 | 4.9 | 0.8 | — | 7.0 | 972 | 721 | 84 | 0.42 | 0.48 | Example |
| 7 | 1.5 | 3.0 | — | 85.1 | 0.8 | 2.0 | 1.5 | 4.9 | 0.8 | — | 7.0 | 1008 | 787 | 102 | 0.43 | 0.59 | Example |
| 8 | 1.8 | 3.0 | — | 68.5 | 0.8 | 2.0 | 1.7 | 4.9 | 0.8 | — | 7.0 | 938 | 825 | 148 | 0.44 | 0.70 | Example |
| 9 | 2.0 | 3.0 | — | 73.1 | 0.8 | 2.0 | 1.9 | 4.9 | 0.8 | — | 7.0 | 892 | 879 | 89 | 0.42 | 0.85 | Example |
| 10 | 2.2 | 3.0 | — | 67.8 | 0.8 | 2.0 | 2.1 | 4.9 | 0.8 | — | 7.0 | 786 | <u>952</u> | 111 | 0.41 | 0.94 | Comparative Example |
| 11 | 0.0 | 0.5 | — | 71.3 | 0.8 | 0.1 | 0.0 | 0.6 | 0.8 | — | 7.0 | 798 | <u>299</u> | 74 | 0.30 | 0.10 | Comparative Example |
| 12 | 0.0 | 1.5 | — | 79.3 | 0.8 | 0.3 | 0.0 | 1.8 | 0.8 | — | 7.0 | 827 | 352 | 129 | 0.34 | 0.14 | Example |
| 13 | 0.0 | 1.5 | — | 74.4 | 0.8 | 2.0 | 0.0 | 3.5 | 0.8 | — | 7.0 | 834 | 487 | 136 | 0.43 | 0.29 | Example |
| 14 | 0.0 | 5.0 | — | 69.5 | 0.8 | 2.0 | 0.0 | 6.9 | 0.8 | — | 7.0 | 868 | 825 | 101 | 0.44 | 0.71 | Example |
| 15 | 0.0 | 8.0 | — | 83.1 | 0.8 | 2.0 | 0.0 | 9.8 | 0.8 | — | 7.0 | 913 | 852 | 91 | 0.43 | 0.88 | Example |
| 16 | 0.0 | 10.0 | — | 74.4 | 0.8 | 0.3 | 0.0 | 10.2 | 0.8 | — | 7.0 | 879 | 896 | 185 | 0.32 | 0.90 | Example |
| 17 | 0.0 | 11.0 | — | 75.8 | 0.8 | 6.0 | 0.0 | 16.3 | 0.8 | — | 7.0 | 791 | <u>971</u> | 151 | 0.59 | 0.96 | Comparative Example |
| 18 | 1.3 | 3.0 | — | 76.9 | 0.8 | 0.3 | 1.3 | 3.3 | 0.8 | — | 7.0 | 916 | 699 | 156 | 0.31 | 0.46 | Example |
| 19 | 1.3 | 3.0 | — | 76.9 | 0.8 | 1.0 | 1.3 | 3.9 | 0.8 | — | 7.0 | 946 | 706 | 147 | 0.36 | 0.47 | Example |
| 20 | 1.3 | 3.0 | — | 76.9 | 0.8 | 3.0 | 1.3 | 5.9 | 0.8 | — | 7.0 | 998 | 764 | 108 | 0.46 | 0.52 | Example |
| 21 | 1.3 | 3.0 | — | 76.9 | 0.8 | 4.0 | 1.2 | 6.9 | 0.8 | — | 7.0 | 1014 | 793 | 77 | 0.50 | 0.68 | Example |
| 22 | 1.3 | 3.0 | — | 76.9 | 0.8 | 5.0 | 1.2 | 7.8 | 0.8 | — | 7.0 | 1027 | 824 | 168 | 0.53 | 0.70 | Example |
| 23 | 1.3 | 3.0 | — | 76.9 | 0.0 | 2.0 | 1.3 | 4.9 | 0.0 | — | 7.0 | 657 | <u>268</u> | 89 | 0.41 | 0.09 | Comparative Example |
| 24 | 1.3 | 3.0 | — | 76.9 | 0.2 | 2.0 | 1.3 | 4.9 | 0.2 | — | 7.0 | 846 | 325 | 105 | 0.40 | 0.19 | Example |
| 25 | 1.3 | 3.0 | — | 76.9 | 0.4 | 2.0 | 1.3 | 4.9 | 0.4 | — | 7.0 | 902 | 476 | 151 | 0.42 | 0.28 | Example |
| 26 | 1.3 | 3.0 | — | 76.9 | 0.6 | 2.0 | 1.3 | 4.9 | 0.6 | — | 7.0 | 958 | 652 | 97 | 0.43 | 0.45 | Example |
| 27 | 1.3 | 3.0 | — | 76.9 | 1.0 | 2.0 | 1.3 | 4.9 | 1.0 | — | 7.0 | 925 | 796 | 178 | 0.41 | 0.61 | Example |
| 28 | 1.3 | 3.0 | — | 76.9 | 1.2 | 2.0 | 1.3 | 4.9 | 1.2 | — | 7.0 | 862 | 869 | 141 | 0.43 | 0.79 | Example |
| 29 | 1.3 | 3.0 | — | 76.9 | 1.4 | 2.0 | 1.3 | 4.9 | 1.4 | — | 7.0 | 798 | <u>932</u> | 169 | 0.44 | 0.90 | Comparative Example |
| 30 | 1.3 | 3.0 | — | 76.9 | 0.8 | 2.0 | 1.3 | 4.9 | 0.8 | — | 6.5 | 792 | 722 | 80 | <u>0.29</u> | 0.53 | Comparative Example |
| 31 | 1.3 | 3.0 | — | 76.9 | 0.8 | 2.0 | 1.3 | 4.9 | 0.8 | — | 6.6 | 816 | 725 | 147 | 0.31 | 0.52 | Example |
| 32 | 1.3 | 3.0 | — | 76.9 | 0.8 | 2.0 | 1.3 | 4.9 | 0.8 | — | 6.7 | 831 | 723 | 125 | 0.32 | 0.52 | Example |
| 33 | 1.3 | 3.0 | — | 76.9 | 0.8 | 2.0 | 1.3 | 4.9 | 0.8 | — | 6.8 | 865 | 719 | 176 | 0.37 | 0.51 | Example |
| 34 | 1.3 | 3.0 | — | 76.9 | 0.8 | 2.0 | 1.3 | 4.9 | 0.8 | — | 6.9 | 919 | 722 | 105 | 0.39 | 0.49 | Example |
| 35 | 1.3 | 3.0 | — | 76.9 | 0.8 | 2.0 | 1.3 | 4.9 | 0.8 | — | 7.1 | 1008 | 721 | 78 | 0.48 | 0.48 | Example |
| 36 | 1.3 | 3.0 | — | 76.9 | 0.8 | 2.0 | 1.3 | 4.9 | 0.8 | — | 7.2 | 1061 | 724 | 169 | 0.51 | 0.47 | Example |
| 37 | 1.3 | 3.0 | — | 76.9 | 0.8 | 2.0 | 1.3 | 4.9 | 0.8 | — | 7.3 | 1123 | 720 | 141 | 0.55 | 0.46 | Example |
| 38 | 1.3 | 3.0 | — | 35.0 | 0.8 | 2.0 | 1.3 | 4.9 | 0.8 | — | 7.0 | 1004 | 701 | 199 | 0.59 | 0.89 | Example |
| 39 | 1.3 | 3.0 | — | 115.0 | 0.8 | 2.0 | 1.3 | 4.9 | 0.8 | — | 7.0 | 803 | 689 | 199 | 0.30 | 0.88 | Example |

*1 Chemical composition of alloyed steel powder with the balance being Fe and inevitable impurities
*2 The maximum particle size is 180 μm.
*3 The total of alloyed steel powder and alloying powder is 100 mass %.
*4 Chemical composition of sintered body with the balance being Fe and inevitable impurities It can be seen that all of our examples are high strength sintered bodies with a tensile strength of 800 MPa or more, a small flank wear width of the turning tool, and excellent lathe turnability.

The invention claimed is:

1. An iron-based alloy sintered body comprising:
   a chemical composition containing
   Cu: 1.8 mass % or more and 10.2 mass % or less,
   Mo: 2.0 mass % or less, and
   C: 0.2 mass % or more and 1.2 mass % or less,
   with the balance being Fe and inevitable impurities, and
   a microstructure having an average Vickers hardness of 300 Hv or more and 900 Hv or less and a standard deviation of Vickers hardness of 200 Hv or less,
   wherein an average pore circularity is 0.30 or more."

2. The iron-based alloy sintered body according to claim 1, wherein a density is 6.6 Mg/m$^3$ or more.

3. The iron-based alloy sintered body according to claim 1, wherein Mo is contained in an amount of 0.5 mass % or more and 2.0 mass % or less.

4. The iron-based alloy sintered body according to claim 2, wherein Mo is contained in an amount of 0.5 mass % or more and 2.0 mass % or less.

5. An iron-based mixed powder for powder metallurgy comprising:
   a pre-alloyed steel powder obtained by pre-alloying Cu or Mo and Cu;
   a Cu powder; and
   a graphite powder,
   wherein the iron-based mixed powder for powder metallurgy has a chemical composition containing
   Cu: 1.8 mass % or more and 10.2 mass % or less,
   Mo: 2.0 mass % or less, and
   C: 0.2 mass % or more and 1.2 mass % or less,
   with the balance being Fe and inevitable impurities, and
   the Cu powder is contained in an amount of 0.3 mass % or more.

6. The iron-based mixed powder for powder metallurgy according to claim 5, wherein the pre-alloyed steel powder has a mean particle size of 30 μm or more and 120 μm or less.

7. The iron-based mixed powder for powder metallurgy according to claim 5, further comprising a lubricant.

8. The iron-based mixed powder for powder metallurgy according to claim 6, further comprising a lubricant.

9. An iron-based mixed powder for powder metallurgy comprising:
   a pre-alloyed steel powder obtained by pre-alloying Mo and Cu;
   a Cu powder; and
   a graphite powder,
   wherein the iron-based mixed powder for powder metallurgy has a chemical composition containing
   Cu: 1.8 mass % or more and 10.2 mass % or less,
   Mo: 0.5 mass % or more and 2.0 mass % or less, and
   C: 0.2 mass % or more and 1.2 mass % or less,
   with the balance being Fe and inevitable impurities, and
   the Cu powder is contained in an amount of 0.3 mass % or more.

10. The iron-based mixed powder for powder metallurgy according to claim 9, wherein the pre-alloyed steel powder has a mean particle size of 30 μm or more and 120 μm or less.

11. The iron-based mixed powder for powder metallurgy according to claim 9, further comprising a lubricant.

12. The iron-based mixed powder for powder metallurgy according to claim 10, further comprising a lubricant.

* * * * *